(12) United States Patent
Nakajima

(10) Patent No.: US 6,666,413 B2
(45) Date of Patent: Dec. 23, 2003

(54) ATTACHMENT STRUCTURE FOR A CENTER DISPLAY UNIT

(75) Inventor: Hirokatsu Nakajima, Nagoya (JP)

(73) Assignees: Autonetworks Technologies, Ltd., Aichi (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/345,315

(22) Filed: Jan. 16, 2003

(65) Prior Publication Data

US 2003/0146350 A1 Aug. 7, 2003

(30) Foreign Application Priority Data

Feb. 6, 2002 (JP) ........................ 2002-029876

(51) Int. Cl.⁷ ............................. G12B 9/00; B62D 25/14
(52) U.S. Cl. ........................................ 248/27.1; 296/70
(58) Field of Search .................. 248/27.1; 108/45; 224/400; 307/70.1; 296/70 R, 72

(56) References Cited

U.S. PATENT DOCUMENTS

| | | | | |
|---|---|---|---|---|
| 4,462,564 A | * | 7/1984 | Alves et al. | 248/27.1 |
| 5,104,071 A | * | 4/1992 | Kowalski | 248/27.1 |
| 5,106,039 A | * | 4/1992 | Gross | 248/27.1 |
| 5,788,532 A | * | 8/1998 | Takiguchi et al. | 439/374 |
| 5,856,908 A | * | 1/1999 | Takiguchi et al. | 361/690 |
| 5,857,726 A | * | 1/1999 | Yokoyama et al. | 296/70 |
| 5,865,403 A | * | 2/1999 | Covell | 248/27.1 |
| 5,889,337 A | | 3/1999 | Ito et al. | |
| 6,179,253 B1 | * | 1/2001 | Cotton | 248/27.1 |
| 6,502,888 B2 | * | 1/2003 | Inoue et al. | 296/72 |
| 6,529,381 B1 | * | 3/2003 | Schoenfish | 361/725 |

FOREIGN PATENT DOCUMENTS

JP        2003025876 A  *  1/2003

* cited by examiner

Primary Examiner—Anita King
(74) Attorney, Agent, or Firm—Oliff & Berridge, PLC

(57) ABSTRACT

Metal brackets are provided on the back of a resin frame of an instrument panel. Bosses are provided on right and left sides of an opening of the resin frame and project from the front and back surfaces of the resin frame, and may share the same axes. A display unit and the metal brackets are provided with boss and boss holes, respectively. The display unit is positioned with respect to the resin frame by inserting the back-side bosses of the resin frame into the boss holes of the metal brackets and inserting the front-side bosses of the resin frame into the boss holes of the display unit. In this state, fasteners are inserted into the fastener holes of the display unit and the resin frame and engaged with the metal brackets.

8 Claims, 6 Drawing Sheets

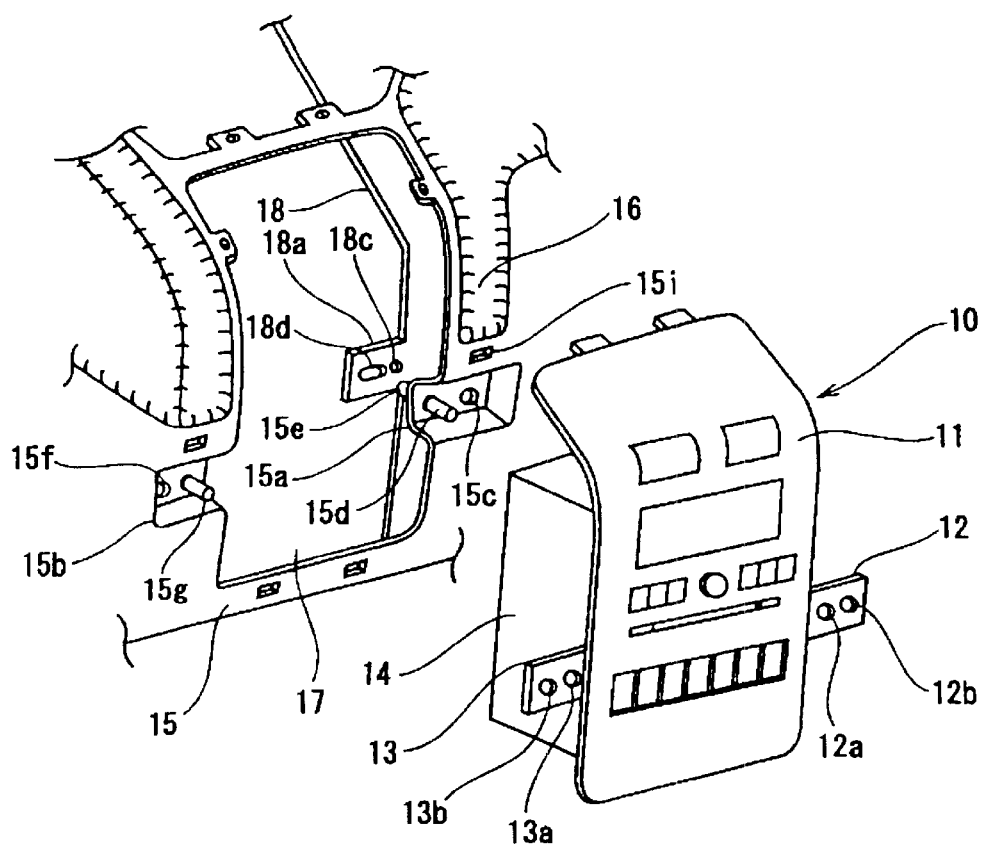
[Fig. 1]

[Fig. 2]
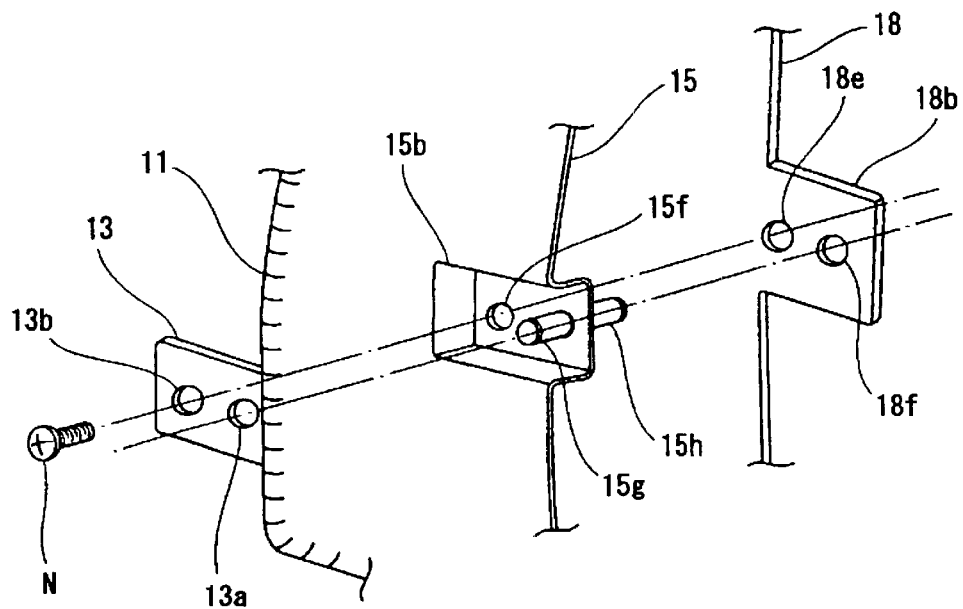
[Fig. 3]
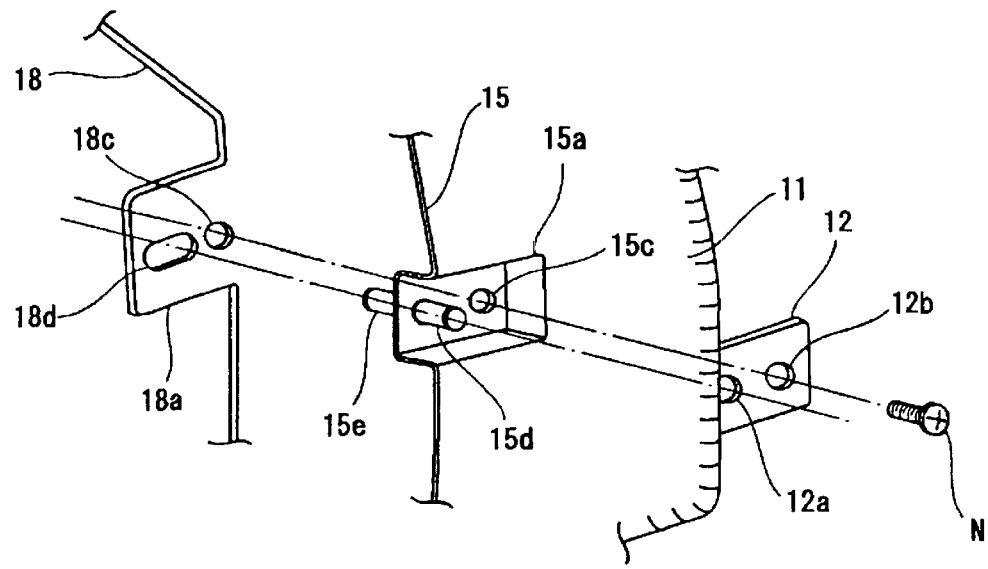

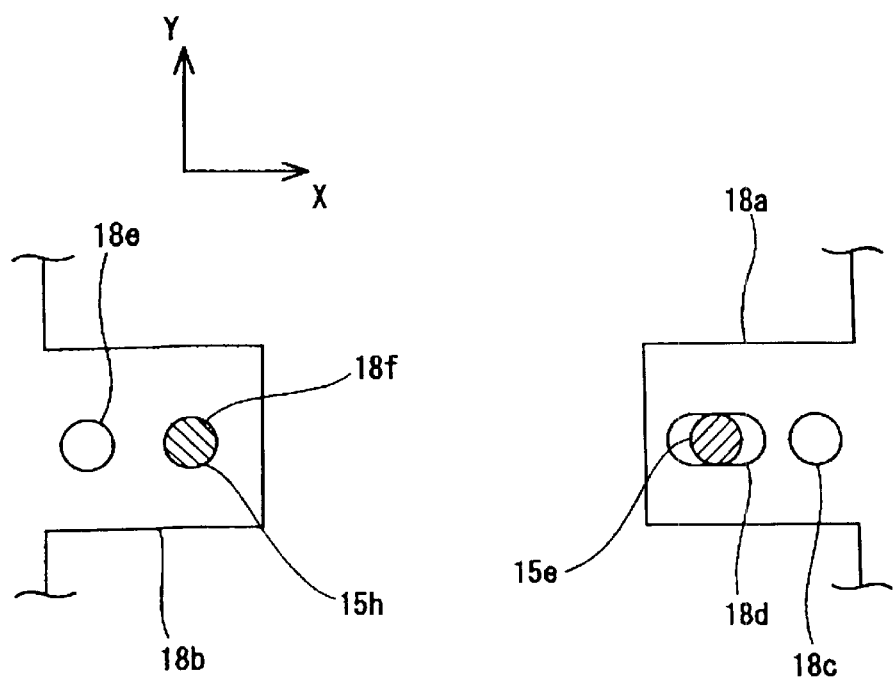

[Fig. 5]
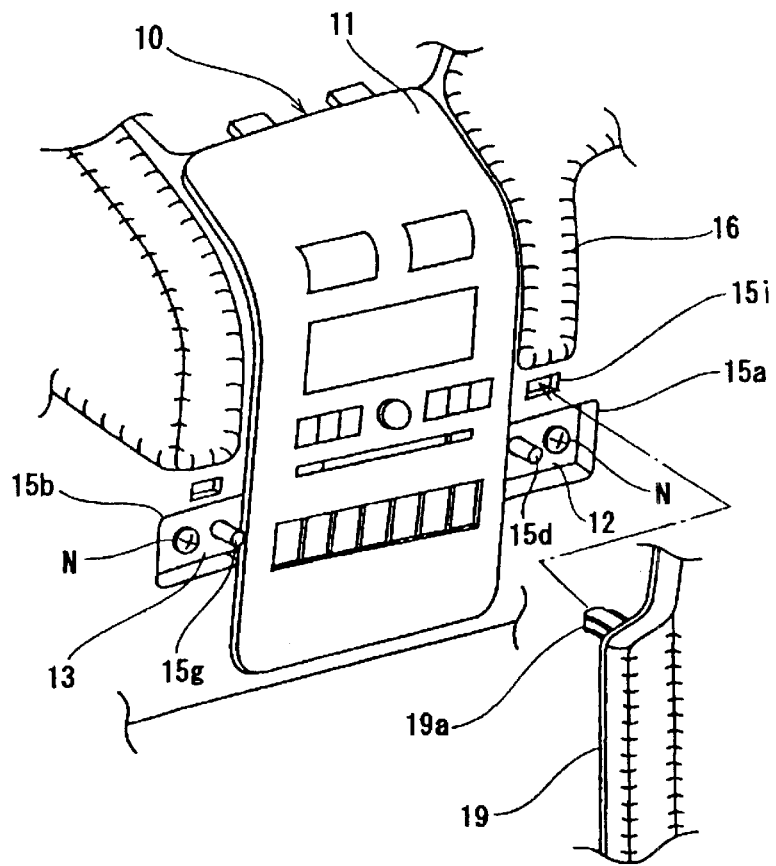
[Fig. 6]
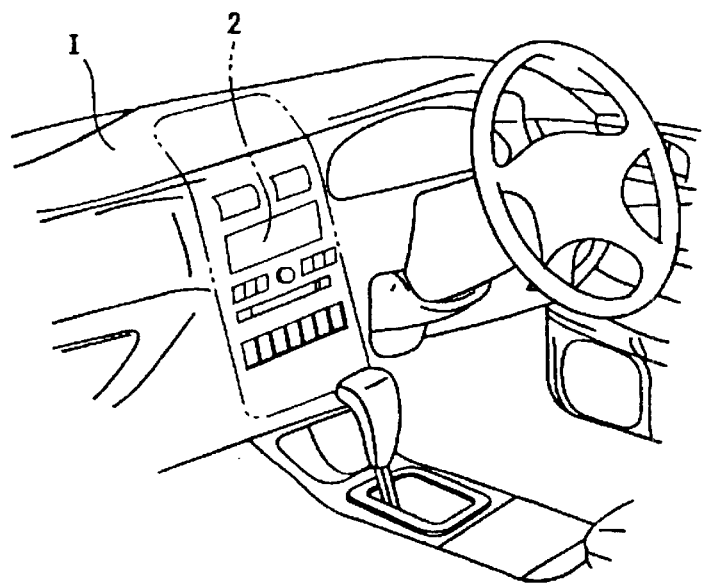
RELATED ART

[Fig. 7]
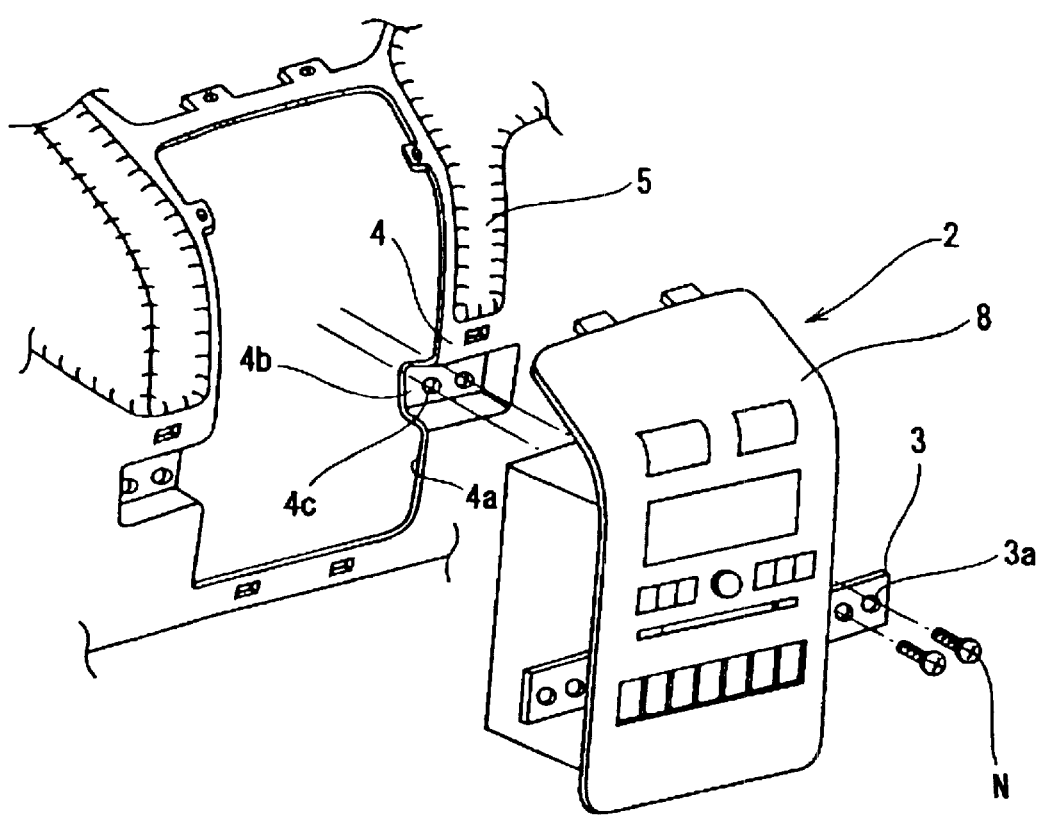
RELATED ART

[Fig. 8]
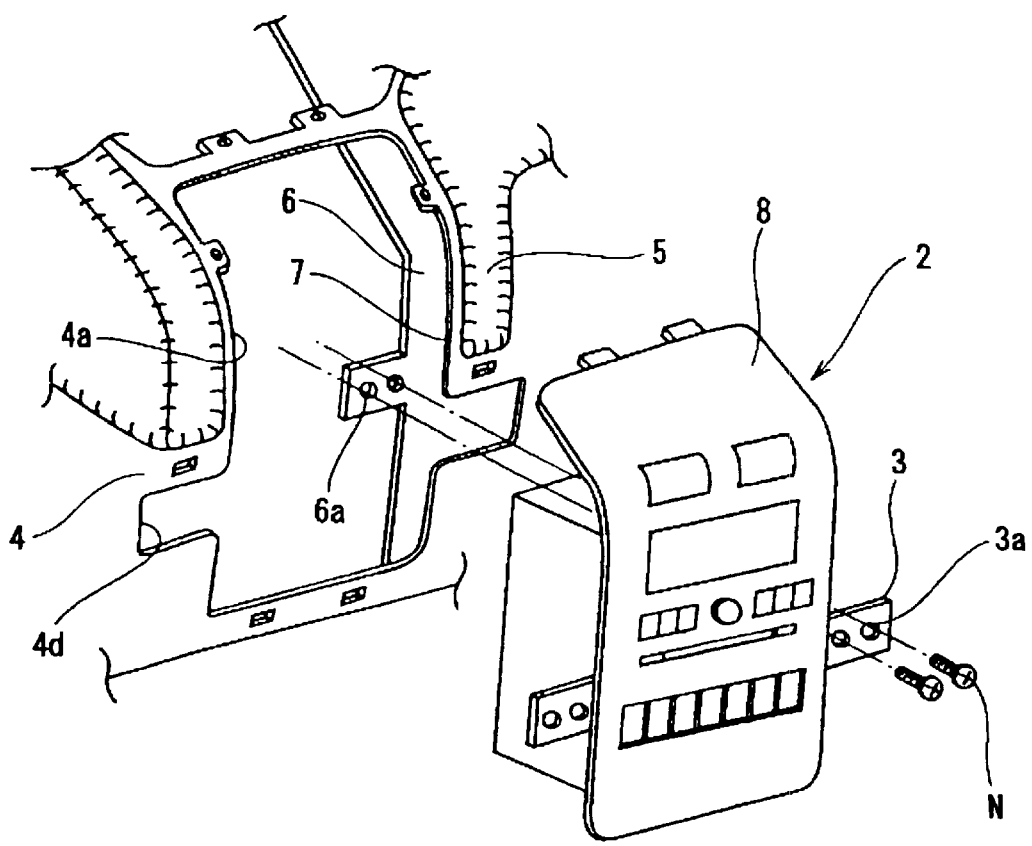
RELATED ART

ATTACHMENT STRUCTURE FOR A CENTER DISPLAY UNIT

BACKGROUND OF THE INVENTION

1. Field of the Invention

The present invention relates to an attachment structure for a display unit, and makes it possible to fix a display unit to an instrument panel while easily positioning the former with respect to the latter.

2. Description of Related Art

As shown in FIG. 6, a center display unit (hereafter abbreviated as "CDU") 2 is provided as a module, in which manipulation devices, indicators, and the like of audio equipment, an air conditioner, or the like are provided. The CDU is housed in an instrument panel I of an automobile at a central portion that is located between the driver's seat and the front passenger seat.

A method of attaching the CDU 2 to the automobile body is as follows. As shown in FIG. 7, a resin frame 4 of the instrument panel I is formed with recesses 4b on the right and left sides of an opening 4a of the resin frame 4, and end surfaces of the recesses 4b are formed with CDU fixing holes 4c. Fixing pieces 3 of the CDU 2 are fitted into the recesses 4b, fixing holes 3a of the fixing pieces 3 are brought into registration with the CDU fixing holes 4c, and the CDU 2 is fixed to the instrument panel I with screws N. In attaching the CDU 2, the surface of a decorative plate 8, which is the front surface of the CDU 2, is positioned with respect to the surfaces of decorative members 5 that cover the surface of the resin frame 4, e.g., so as to be coplanar with the decorative members 5.

Alternatively, as shown in FIG. 8, metal brackets 6 that are provided on the back of the resin frame 4 are formed with fixing holes 6a. The fixing pieces 3 of the CDU 2 are inserted through notches 4d of the resin frame 4, fixing holes 3a of the fixing pieces 3 of the CDU 2 are then brought into registration with the fixing holes 6a of the metal brackets 6, and the CDU 2 is fixed with screws N.

The CDU attachment structure of FIG. 7 has an advantage that the surface of the decorative plate 8 of the attached CDU 2 can easily be positioned with respect to the surface of the decorative members 5 on the resin frame 4 in an accurate manner and dimensional management can be performed easily, because the CDU 2 is directly fixed to the resin frame 4. However, this attachment structure is not very strong because the heavy CDU 2 is directly held by the resin frame 4.

On the other hand, the CDU attachment structure of FIG. 8 has an advantage that it provides sufficient strength to hold the heavy CDU 2 because the CDU 2 is fixed to the metal brackets 6. However, since the CDU 2 is not directly fixed to the resin frame 7, that is, the metal brackets 6 intervene between them, a positional deviation tends to occur between the surface of the decorative plate 8 of the CDU 2 and the decorative members 5 of the resin frame 7, which makes it necessary to increase the accuracy of parts dimensions. This results in a problem that the cost of adjustment of parts molding dies is high. Another problem is that the CDU attachment takes a long time.

SUMMARY OF THE INVENTION

The present invention has been made in view of the above-described problems, and an object of the invention is therefore to make it possible to use metal brackets that are strong enough to hold a heavy CDU, to easily perform positioning between the metal brackets, a resin frame, and a CDU, and to easily and reliably position decorative surfaces of the resin frame and the CDU with respect to each other.

To attain these objects, the invention provides an attachment structure for attaching a display unit (e.g., a center display unit ("CDU")) to a frame (e.g., a resin frame) of an instrument panel of an automobile so that the CDU is inserted in an opening of the resin frame. The attachment structure has a frame that includes bosses provided at first and second sides (e.g., right and left sides) of the opening. The bosses include first bosses projecting from a back surface of the frame and second bosses projecting from a front surface of the frame. The first and second bosses may share the same axes, i.e., may be coaxial. First fastener holes are also provided in the frame. Metal brackets are provided on the back of the resin frame. The metal brackets include first boss holes and second fastener holes at positions corresponding to positions of the first bosses and the first fastener holes, respectively, and a display unit includes second boss holes at positions corresponding to positions of the second bosses, and third fastener holes at positions corresponding to the first and second fastener holes. The CDU is positioned with respect to the frame by the interaction of the bosses and boss holes. The back-side bosses of the resin frame are inserted into the boss holes of the metal brackets and the front-side bosses of the resin frame are inserted into the boss holes of the CDU. In this state, screws are inserted into the fastener holes of the CDU, the resin frame and the metal brackets and engaged with the metal brackets, whereby the CDU is fixed to and supported by the metal brackets.

The bosses that project from the front and back surfaces of the resin frame and the resin frame may be formed by integral molding.

With the above configuration, the surface (hereinafter referred to as "decorative surface") of a decorative plate of the CDU and the surfaces (hereinafter referred to as "decorative surfaces") of decorative members of the resin frame can easily be positioned with respect to each other in a state that the bosses sharing the same axes and respectively projecting from the front and back surfaces of the intermediate resin frame are fitted in the boss holes of the metal brackets and the CDU. In this positioned state, the CDU is fastened to the metal brackets with fasteners (e.g., screws), whereby the CDU can be attached to the instrument panel in such a manner that the decorative surfaces of the CDU and the resin frame do not become misaligned from each other.

The screws for fastening the CDU to the metal brackets are inserted into the fastener holes (e.g., screw holes) of the CDU and the resin frame and are engaged with the screw holes of the metal brackets, or nuts that are provided on the back of the metal brackets. Since the CDU is fastened to the metal brackets with the screws in this manner, the metal brackets can support the load of the CDU. Therefore, even if the CDU is heavy, there is sufficient support for the CDU and the resin frame need not be made strong enough to support the CDU.

Further, the above-described attachment structure enables positional adjustment between the CDU and the resin frame when the CDU is attached, which makes it unnecessary to set the dimensional accuracy of the CDU and the resin frame very high. This reduces the die adjustment cost and the work time for production of the CDU and the resin frame.

The bosses may have cylindrical shapes. One of the boss holes of the metal brackets may be a circular hole to be fitted with the boss on the same side and serves for the positioning boss, and the other boss hole may be an elongated hole having a minor-axis length that is substantially the same as a diameter of the associated boss. This arrangement enables easy position adjustment and prevents skewing.

With the above-described configuration, when the resin frame is attached to the metal brackets, one of the back-side, right and left cylindrical bosses is inserted into the circular hole that is one of the right and left boss holes of the metal brackets to attain positioning. On the other hand, when the other cylindrical boss is inserted into the elongated boss hole of the metal bracket, the elongated boss hole absorbs a dimensional error between the two cylindrical bosses and allows easy insertion of the cylindrical boss because the major axis of the elongated boss hole is larger than the outer diameter of the cylindrical boss.

Therefore, after inserting one boss into a corresponding boss hole, the other boss can still be inserted into its corresponding boss hole even if the distance between centers of the bosses is slightly different from the distance between centers of the boss holes.

In this manner, even if there are deviations between the interval between the right and left bosses of the resin frame, the interval between the right and left boss holes of the metal brackets, and/or the interval between the right and left boss holes of the CDU, since one of the boss holes of the metal brackets is an elongated hole which enables adjustment, the deviations between the intervals can be corrected for and the decorative surfaces of the CDU and the resin frame can easily be positioned with respect to each other.

During the above-described position adjustment, since the minor-axis length of the elongated boss hole is approximately equal to the outer diameter of the cylindrical boss, the circular boss hole of the metal bracket serves to position the metal frame and the elongated boss hole serves to prevent skewing while enabling position adjustment in the right-left direction.

The boss hole of the CDU corresponding to the elongated boss hole of the metal bracket may also be an elongated hole. As a further alternative, the screw holes of the CDU may have larger diameters than screws to be inserted therein in order to absorb dimensional errors.

A decorative surface may be formed by applying a resin cover to hide the screws (or bolts) and the bosses that are exposed by attaching the CDU to the resin frame. The resin cover may be provided with clip portions and the resin frame may have clip holes provided therein. The resin cover may be fixed to the resin frame by inserting the clip portions into the clip holes and engaging the clip portions with the clip holes.

BRIEF DESCRIPTION OF THE DRAWING

The foregoing and other features of the present invention are described in or are apparent from the following detailed description of exemplary embodiments, which refers to the accompanying drawings, wherein:

FIG. 1 is a perspective view showing a center display unit (CDU) before attachment according to an embodiment of the present invention;

FIG. 2 is a drawing illustrating how a left-hand fixing piece of the CDU is attached;

FIG. 3 is a drawing illustrating how a right-hand fixing piece of the CDU is attached;

FIG. 4 is a drawing showing a state in which a resin frame is attached to metal brackets;

FIG. 5 is a perspective view of the CDU after attachment;

FIG. 6 is a drawing illustrating where the CDU is disposed;

FIG. 7 is a perspective view illustrating a conventional CDU attachment structure; and FIG. 8 is a perspective view illustrating another conventional CDU attachment structure.

DETAILED DESCRIPTION OF PREFERRED EMBODIMENTS

As shown in FIG. 1, a resin frame 15 has an opening 17 for attachment of a center display unit (abbreviated as "CDU") 10, on which manipulation devices, indicators, and the like of audio equipment, an air conditioner, or the like may be provided. The resin frame 15 is provided in an instrument panel I of an automobile, for example, at a central position located between the driver's seat and the front passenger seat. Metal brackets 18 are provided at, for example, right and left sides of the opening 17 of the resin frame 15. The CDU 10 may be fixed to the resin frame 15 by attaching the CDU 10 to the resin frame 15 from the front side to close the opening 17.

The resin frame 15 is formed with fixing recesses 15a and 15b at prescribed positions on the right and left sides of the opening 17. End portions of the fixing recesses 15a and 15b are formed with fastener holes (e.g., screw holes) 15c and 15f, respectively. The screw holes 15c and 15f are holes through which screws or other fasteners are to be inserted and whose inner circumferential surfaces need not be threaded.

Cylindrical bosses 15d and 15e project respectively from the front and back surfaces of the end portion of the fixing recess 15a by the side of the screw hole 15c, preferably such that the cylindrical bosses 15d and 15e share the same axis. Similarly, cylindrical bosses 15g and 15h (see FIG. 2) project respectively from the front and back surfaces of the end portion of the fixing recess 15b by the side of the screw hole 15f. The cylindrical bosses 15g and 15h preferably share the same axis. The cylindrical bosses 15d, 15e, 15g, and 15h may be formed by integral molding.

Decorative members 16 may be attached to a compartment-side surface of the resin frame 15. Near the fixing recesses 15a and 15b, there are clip holes 15i for attachment of a resin cover 19.

The CDU 10 includes a decorative plate 11, having manipulation devices, indicators and the like, is provided on the front side of a main body 14 that houses audio equipment, air conditioning system components, or the like. A pair of fixing pieces 12 and 13 project respectively outward at prescribed positions on the right and left sides. The fixing pieces 12 and 13 may be formed with respective screw holes 12b and 13b and may also be formed with circular boss holes 12a and 13a side by side with the screw holes 12b and 13b, respectively.

The fixing pieces 12 and 13 are so shaped as to be able to be inserted into the respective fixing recesses 15a and 15b of the resin frame 15. The diameter of the circular boss holes 12a and 13a may be slightly larger than that of the front-side cylindrical bosses 15d and 15g so as to be able to absorb dimensional errors.

The metal brackets 18 are provided behind the resin frame 15 on the right and left sides of the opening 17. Fixing pieces 18a and 18b (see FIG. 2) project from the respective metal brackets 18 on the side of the opening 17. As shown in FIG. 2, the fixing piece 18b is formed with a screw hole 18e and may also be formed with a circular boss hole 18f side by side with the screw hole 18e. As shown in FIG. 3, the fixing piece 18a is formed with a screw hole 18c and may also be formed with an elongated boss hole 18d whose major axis extends in the right-left direction and whose minor axis extends in the up-down direction. However, the boss hole 18f may be made elongated, and the boss hole 18d may be made circular. The inner circumferential surfaces of the screw holes 18c and 18e may be threaded.

As shown in FIG. 2, the circular boss hole 18f has approximately the same diameter as the cylindrical boss 15h which projects from the back of the resin frame 15, and the circular boss hole 18f serves for positioning of the cylindrical boss 15h. Similarly, the length of the minor axis of the elongated boss hole 18d is approximately the same as the diameter of the right-hand cylindrical boss 15e which projects from the back of the resin frame 15 as shown in FIG. 3, whereby the cylindrical boss 15e is not movable in the up-down direction yet is movable in the right-left direction. This is to prevent the resin frame 15 from skewing.

Next, a procedure for attaching the CDU 10 to the instrument panel I will be described.

First, as shown in FIG. 2, the back-side cylindrical boss 15h, which projects from the left-hand fixing recess 15b of the resin frame 15, is inserted into the circular boss hole 18f of the fixing piece 18b of the left-hand metal bracket 18. Then, as shown in FIG. 3, the back-side cylindrical boss 15e, which projects from the right-hand fixing recess 15a of the resin frame 15, is inserted into the elongated boss hole 18d of the fixing piece 18a of the right-hand metal bracket 18.

At this time, since the major axis of the elongated boss hole 18d of the fixing piece 18a is longer than the diameter of the cylindrical boss 15e, the elongated boss hole 18d can absorb a dimensional error in the X direction (see FIG. 4) between the cylindrical bosses 15e and 15h. That is, the bosses 15e and 15h can still be inserted into the boss holes 18d and 18f, respectively even if the distance between centers of the bosses 15e and 15h is slightly different from the distance between centers of the boss holes 18d and 18f. Further, since the minor-axis length of the elongated boss hole 18d is approximately equal to the diameter of the cylindrical boss 15e, the cylindrical boss 15e can be positioned in the Y direction.

When the main body 14 of the CDU 10 is inserted into the opening 17 of the resin frame 15, the front-side cylindrical bosses 15d and 15g of the right and left fixing recesses 15a and 15b of the resin frame 15 are inserted into the circular boss holes 12a and 13a of the right and left fixing pieces 12 and 13, respectively, of the CDU 10.

At this time, the portion of the resin frame 15 having the recess 15a can be deflected slightly left-ward or right-ward, if necessary, because the cylindrical boss 15e can slide left-ward and right-ward within the elongated boss hole 18d. This left-ward or right-ward deflection of the resin frame 15 allows the interval between the right and left cylindrical bosses 15d and 15g of the resin frame 15 to match the interval between the circular boss holes 12a and 13a of the CDU 10, respectively. Therefore, the CDU 10 can be positioned with respect to the resin frame 15, and the decorative plate 11 of the CDU 10 can be made flush with the decorative surfaces of the decorative members 16 of the resin frame 15.

With the screw holes 12b, 15c, and 18c in registration with each other, a screw N is inserted through the screw holes 12b and 15c and then threaded into the screw hole 18c of one metal bracket 18. Similarly, with the screw holes 13b, 15f, and 18e in registration with each other, another screw N is inserted through the screw holes 13b and 15f and then threaded into the screw hole 18e of the other metal bracket 18. As a result, the CDU 10, the resin frame 15, and the metal brackets 18 are fastened to each other with the screws N.

In the above-described operation, the screw holes 12b and 13b whose diameter is slightly larger than the outer diameter of the shank of the screws N can absorb dimensional errors.

As described above, the CDU 10 is fastened to the metal brackets 18 with the screws N, and the metal brackets 18 support the weight of the CDU 10. This increases the strength for holding the CDU 10. Since the screws N merely penetrate through the screw holes 15c and 15f of the resin frame 15, the resin frame 15 receives little or no weight load of the CDU 10.

Finally, to hide the screws N and the cylindrical bosses 15d and 15g that are exposed in the fixing recesses 15a and 15b of the resin frame 15, a resin cover 19 may be applied to become a part of a decorative surface, as shown in FIG. 5. The resin cover 9 may be engaged with the resin frame 15 by inserting clip portions 19a of the resin cover 19 into the clip holes 15i of the resin frame 15.

Alternatively, rather than threading screws into the screw holes 18c and 18e of the metal brackets 18, bolts may be inserted through the screw holes of the CDU 10, the resin frame 15, and the metal brackets 18, and engaged with nuts that are provided on the back side of the metal brackets 18.

As is apparent from the above description, according to the invention, the bosses may project from the front and back surfaces of the resin frame of the instrument panel, and may share the same axes. The CDU can be positioned with respect to the resin frame by inserting the bosses into the boss holes of the CDU and the metal brackets. In this state, the metal brackets, the resin frame, and the CDU are fastened to each other. Therefore, the decorative surfaces of the CDU and the resin frames can easily be positioned relative to each other.

Further, the support strength can be increased because the CDU is fastened to the metal brackets with screws and hence the metal brackets support the weight of the CDU.

Whereas the bosses that project from the front and back surfaces of the resin frame may be cylindrical shapes, one of the boss holes of the metal brackets may be a circular hole and the other boss hole may be an elongated hole. With this structure, one of the back-side cylindrical bosses of the resin frame serves as a reference for positioning and the other cylindrical boss is inserted into the elongated boss hole to enable position adjustment. The interval of the front-side cylindrical bosses of the resin frame can be made equal to that of the boss holes of the CDU, which enables smooth positioning between the CDU and the resin frame.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

What is claimed is:

1. A display unit attachment structure that attaches a display unit to a frame of an instrument panel of an automobile, comprising:

a frame including bosses provided at first and second sides of an opening provided in the frame, the bosses including first bosses projecting from a back surface of the frame and second bosses projecting from a front surface of the frame, and first fastener holes being provided in the frame;

metal brackets including first boss holes and second fastener holes at positions corresponding to positions of the first bosses and the first fastener holes, respectively, the first boss holes being respectively engageable with the first bosses; and a display unit including second boss holes at positions corresponding to positions of the second bosses, and third fastener holes at positions corresponding to positions of the first and second fastener holes, the second boss holes being respectively engageable with the second bosses.

2. The display unit attachment structure according to claim 1, wherein the first and second bosses have cylindrical shapes, one of the first boss holes of the metal brackets is a circular hole, and another one of the first boss holes is an elongated hole having a minor-axis length that is substantially the same as a diameter of the associated boss.

3. The display unit attachment structure according to claim 1, further comprising:

fixing pieces provided on first and second sides of the display unit; and fixing recesses provided on the first and second sides of the opening of the frame;

wherein the first and second bosses are provided at the fixing recesses, and the second boss holes are provided in the fixing pieces.

4. The display unit attachment structure according to claim 3, further comprising at least one cover that covers the fixing recesses.

5. The display unit attachment structure according to claim 1, wherein the first and second bosses are integrally molded structure formed as one piece with the frame.

6. The display unit attachment structure according to claim 1, wherein each first boss is coaxial with a second boss.

7. A vehicle having the center display unit attachment structure according to claim 1 incorporated therein.

8. A method for attaching a display unit on a frame of an instrument panel of an automobile using a display unit attachment structure according to claim 1, the method comprising:

inserting the first bosses into the first boss holes;

inserting the second bosses into the second boss holes; and fixing the display unit to the frame by inserting a fastener through each aligned first, second and third fastener hole.

* * * * *